(12) United States Patent
Kitagawa et al.

(10) Patent No.: US 11,480,357 B2
(45) Date of Patent: Oct. 25, 2022

(54) AIR TREATMENT DEVICE

(71) Applicant: DAIKIN INDUSTRIES, LTD., Osaka (JP)

(72) Inventors: Keita Kitagawa, Osaka (JP); Yoshiteru Nouchi, Osaka (JP); Masaya Nishimura, Saka (JP); Youichi Handa, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/368,352

(22) Filed: Jul. 6, 2021

(65) Prior Publication Data

US 2021/0333005 A1 Oct. 28, 2021

Related U.S. Application Data

(63) Continuation of application No. PCT/JP2019/050663, filed on Dec. 24, 2019.

(30) Foreign Application Priority Data

Feb. 26, 2019 (JP) .............................. JP2019-033327

(51) Int. Cl.
  *G01N 21/94* (2006.01)
  *F24F 11/63* (2018.01)
  (Continued)

(52) U.S. Cl.
  CPC ................ *F24F 11/63* (2018.01); *F24F 3/14* (2013.01); *F24F 11/32* (2018.01); *F24F 13/222* (2013.01);
  (Continued)

(58) Field of Classification Search
  CPC . F24F 11/63; F24F 3/14; F24F 13/222; G01N 21/17; G01N 21/94;
  (Continued)

(56) References Cited

U.S. PATENT DOCUMENTS

| 6,818,177 B1* | 11/2004 | Turcotte .................... A61L 9/20 422/24 |
| 2014/0022547 A1* | 1/2014 | Knox ...................... G08B 25/10 356/338 |

(Continued)

FOREIGN PATENT DOCUMENTS

| CN | 106226270 A | 12/2016 |
| CN | 206132640 U | 4/2017 |

(Continued)

OTHER PUBLICATIONS

International Search Report (PCT/ISA/210) issued in PCT/JP2019/050663, dated Feb. 25, 2020.

(Continued)

*Primary Examiner* — James T Boylan
(74) *Attorney, Agent, or Firm* — Birch, Stewart, Kolasch & Birch, LLP

(57) ABSTRACT

An imaging target includes a light emitter configured to emit visible light from a surface of the imaging target, and an imaging device captures an image of at least the light emitter of the imaging target and acquires image data including the light emitter.

12 Claims, 9 Drawing Sheets

(51) Int. Cl.
  *F24F 11/32* (2018.01)
  *F24F 3/14* (2006.01)
  *F24F 13/22* (2006.01)
  *G01N 21/17* (2006.01)
  *H04N 5/225* (2006.01)

(52) U.S. Cl.
  CPC ............. *G01N 21/17* (2013.01); *G01N 21/94* (2013.01); *H04N 5/2256* (2013.01); *F24F 2003/1446* (2013.01); *G01N 2021/1765* (2013.01)

(58) Field of Classification Search
  CPC .......... G01N 2021/1765; H04N 5/2256; G24F 2003/1446
  See application file for complete search history.

(56) References Cited

U.S. PATENT DOCUMENTS

| | | | | |
|---|---|---|---|---|
| 2017/0319143 | A1* | 11/2017 | Yu | A61B 5/682 |
| 2020/0160497 | A1* | 5/2020 | Shah | B29C 64/386 |
| 2020/0318887 | A1* | 10/2020 | Tsutsumi | F25D 21/14 |
| 2021/0025809 | A1* | 1/2021 | Munn | G01N 17/004 |
| 2021/0190357 | A1* | 6/2021 | Ishizaka | F24F 11/54 |

FOREIGN PATENT DOCUMENTS

| | | |
|---|---|---|
| FR | 3 065 788 A1 | 11/2018 |
| JP | 2005-292066 A | 10/2005 |
| JP | 2007-46864 A | 2/2007 |
| JP | 2007-255757 A | 10/2007 |
| JP | 2007-255840 A | 10/2007 |
| JP | 2008-309449 A | 12/2008 |
| JP | 2009-198168 A | 9/2009 |
| JP | 2010-41120 A | 2/2010 |
| JP | 2015-172519 A | 10/2015 |
| JP | 2018-189257 A | 11/2018 |
| WO | WO 2009/093468 A1 | 7/2009 |
| WO | WO 2014/017066 A1 | 1/2014 |

OTHER PUBLICATIONS

International Preliminary Report on Patentability and Written Opinion of the International Searching Authority for International Application No. PCT/JP2019/050663, dated Aug. 25, 2021, with an English translation.

Extended European Search Report for European Application No. 19916776.8, dated Feb. 17, 2022.

\* cited by examiner

AIR TREATMENT DEVICE

CROSS REFERENCE TO RELATED APPLICATIONS

This application is a Continuation of PCT International Application No. PCT/JP2019/050663, filed on Dec. 24, 2019, which claims priority under 35 U.S.C. 119(a) to Patent Application No. 2019-033327, filed in Japan on Feb. 26, 2019, all of which are hereby expressly incorporated by reference into the present application.

TECHNICAL FIELD

The present disclosure relates to an air treatment device.

BACKGROUND ART

Patent Document 1 discloses an internal observation device for capturing an image of an imaging target inside an air conditioner. The internal observation device captures an image, for example, of a drain pan as the imaging target. A service provider or any other operator observes a state of dirt on the imaging target based on the captured image data.

CITATION LIST

Patent Document

Patent Document 1: Japanese Unexamined Patent Publication No. 2007-255840

SUMMARY

Technical Problem

As disclosed in Patent Document 1, sometimes it is difficult to determine a state of dirt of the imaging target in the image data captured by an imaging device.

It is therefore an object of the present disclosure to facilitate the determination of the state of dirt in the image data captured by the imaging device.

A first aspect is directed to an air treatment device including: a casing (20); an imaging target (50) disposed inside the casing (20); and an imaging device (70) configured to capture an image of the imaging target (50), wherein the imaging target (50) includes a light emitter (E) configured to emit visible light from a surface of the imaging target (50), and the imaging device (70) captures an image of at least the light emitter (E) of the imaging target (50) and acquires image data including the light emitter (E).

DESCRIPTION OF EMBODIMENTS

Figure 1:
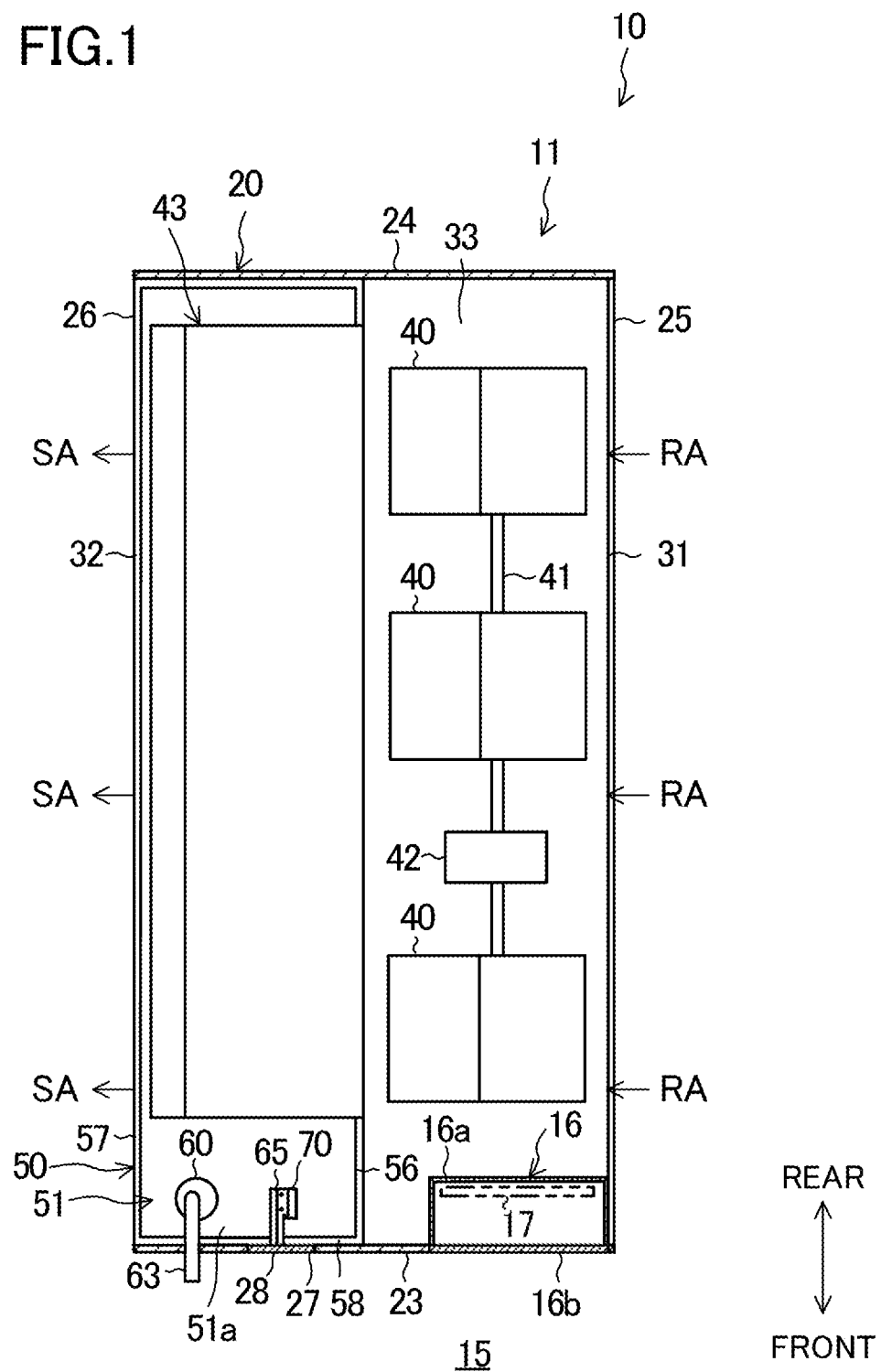
FIG. 1 is a plan view illustrating an internal structure of an air conditioner of a first embodiment.

Embodiments of the present disclosure will be described below with reference to the drawings. The following embodiments are merely exemplary ones in nature, and are not intended to limit the scope, applications, or use of the present invention.

First Embodiment

An air treatment device according to the first embodiment is an air conditioner (10) that adjusts at least the temperature in an indoor space. The air conditioner (10) adjusts the temperature of room air (RA) and supplies the temperature-adjusted air as supply air (SA) into the room. The air conditioner (10) performs a cooling operation and a heating operation.

The air conditioner (10) includes an indoor unit (11). The indoor unit (11) is installed in a space in the ceiling cavity. The indoor unit (11) is connected to an outdoor unit (not shown) via refrigerant pipes. With this connection, the air conditioner (10) forms a refrigerant circuit. The refrigerant circulates in the refrigerant circuit, thereby performing a vapor compression refrigeration cycle. A compressor, an outdoor heat exchanger, an expansion valve, and an indoor heat exchanger (43) are connected to the refrigerant circuit. In the refrigerant circuit, a refrigeration cycle is switched between a first refrigeration cycle and a second refrigeration cycle. The first refrigeration cycle is performed during the cooling operation. The first refrigeration cycle is a cooling cycle in which the outdoor heat exchanger serves as a radiator or a condenser, and the indoor heat exchanger (43) serves as an evaporator. The second refrigeration cycle is performed during the heating operation. The second refrigeration cycle is a heating cycle in which the indoor heat exchanger (43) serves as a radiator or a condenser, and the outdoor heat exchanger serves as an evaporator.

Configuration of Indoor Unit

A schematic configuration of the indoor unit (11) will be described with reference to FIGS. 1 to 4. The indoor unit (11) includes a casing (20), a fan (40), the indoor heat exchanger (43), a drain pan (50), and a drain pump (60). The casing (20) is installed in a space in the ceiling cavity. The fan (40), the indoor heat exchanger (43), the drain pan (50), and the drain pump (60) are disposed inside the casing (20).

Casing

The casing (20) has a shape of a rectangular parallelepiped hollow box. The casing (20) includes a top plate (21), a bottom plate (22), a front plate (23), a rear plate (24), a first side plate (25), and a second side plate (26). The front plate (23) and the rear plate (24) face each other. The first side plate (25) and the second side plate (26) face each other.

The front plate (23) faces a maintenance space (15). The maintenance space (15) is a workspace for a service provider or any other operator. An inspection port (27) is formed in the front plate (23). An inspection cover (28) is detachably attached to the inspection port (27). The drain pan (50) is arranged on the inner side of the inspection port (27). The inspection port (27) and the drain pan (50) overlap each other as viewed in the thickness direction of the front plate (23). A service provider or any other operator can see the drain pan (50) through the inspection port (27).

An imaging device (70), which will be described in detail later, is supported on the inner surface of the inspection cover (28).

An intake port (31) is formed in the first side plate (25). A suction duct (not shown) is connected to the intake port (31). An inflow end of the suction duct communicates with the indoor space. A blow-out port (32) is formed in the second side plate (26). A blow-out duct (not shown) is connected to the blow-out port (32). An outflow end of the blow-out duct communicates with the indoor space. An air flow path (33) is formed in the casing (20) from the intake port (31) to the blow-out port (32).

Figure 2:
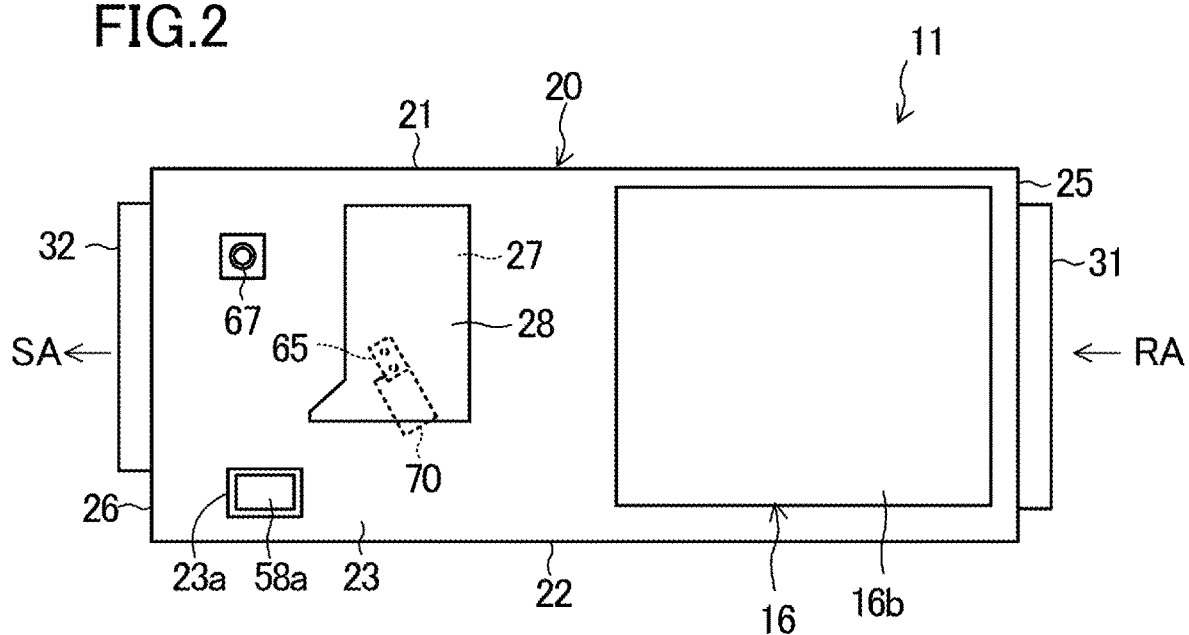
FIG. 2 is a front view illustrating the air conditioner of the first embodiment.
Figure 4:
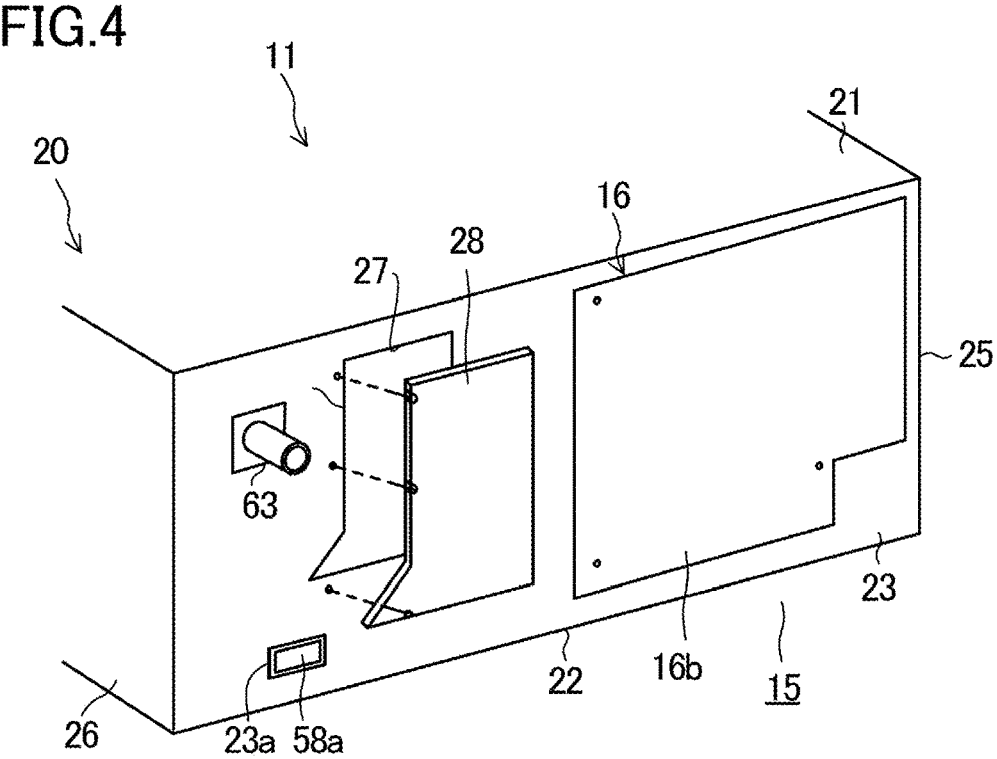
FIG. 4 is a perspective view illustrating a schematic configuration of the air conditioner of the first embodiment, as viewed from the front.

As shown in FIGS. 2 and 4, an opening (23*a*) is formed in a lower portion of the front plate (23). An inspection window (58*a*) for the drain pan (50), which will be described later in detail, is positioned on the inner side of the opening (23*a*). The opening (23*a*) has a rectangular shape as viewed from the front. The opening (23*a*) exposes the inspection window (58*a*) of the drain pan (50) to the outside of the casing (20).

Fan

The fan (40) is disposed in a portion of the air flow path (33) near the first side plate (25). In the present embodiment, three fans (40) are disposed in the air flow path (33). The fans (40) are sirocco fans. The three fans (40) are connected by a rotating shaft (41). The three fans (40) are driven by one motor (42).

Indoor Heat Exchanger

The indoor heat exchanger (43) is disposed in a portion of the air flow path (33) near the second side plate (26). The indoor heat exchanger (43) is configured as, for example, a fin-and-tube heat exchanger. The indoor heat exchanger (43) of the present embodiment is arranged obliquely (see FIG. 3). The indoor heat exchanger (43) in the first refrigeration cycle cools air. At this time, moisture in the air is condensed to generate condensed water. The indoor heat exchanger (43) in the second refrigeration cycle heats air.

Drain Pan

The drain pan (50) will be described in detail with reference to FIGS. 1, 3, 4, and 6. The drain pan (50) is mounted on the bottom plate (22) in the casing (20). The drain pan (50) is arranged in the air flow path (33). The drain pan (50) is disposed below the indoor heat exchanger (43). The drain pan (50) constitutes a tray for receiving water. Specifically, the drain pan (50) receives condensed water generated in the vicinity of the indoor heat exchanger (43). The drain pan (50) includes at least a bottom plate portion (51), a first side wall (56), a second side wall (57), and a third side wall (58).

The bottom plate portion (51) extends in a front-rear direction along the bottom plate (22) of the casing (20). A bottom surface (51*a*) facing the indoor heat exchanger (43) is formed on the surface of the bottom plate portion (51) (the upper surface in FIG. 3) The bottom plate portion (51) includes the bottom surface (51*a*), a bottom plate portion body (52), and a recessed portion (53) recessed downward from the bottom plate portion body (52). A first bottom surface (52*a*) is formed on the surface of the bottom plate portion body (52) (the upper surface in FIG. 3). The bottom surface (51*a*) is configured to guide water in the drain pan (50) to the recessed portion (53). Specifically, the bottom surface (51*a*) is slightly inclined to send water to the recessed portion (53). A groove (not shown) for guiding water toward the recessed portion (53) is formed on the bottom surface (51*a*).

The recessed portion (53) is positioned closer to the front side of the bottom plate portion (51). The recessed portion (53) is recessed downward from the first bottom surface (52*a*) of the bottom plate portion body (52). The recessed portion (53) is positioned below the drain pump (60). The recessed portion (53) has a second bottom surface (53*a*) and a side surface (53*b*). The second bottom surface (53*a*) is positioned below a suction portion (61) of the drain pump (60). The second bottom surface (53*a*) is the lowermost portion of the bottom surface (51*a*) of the drain pan (50). The side surface (53*b*) is formed around the suction portion (61) of the drain pump (60).

The bottom surface (51*a*) of the drain pan (50) includes the first bottom surface (52*a*) and the second bottom surface (53*a*) described above. The second bottom surface (53*a*) constitutes a portion of the bottom surface (51*a*) of the drain pan (50) positioned below the suction portion (61) of the drain pump (60). A luminous portion (75), which will be described in detail later, is formed on the second bottom surface (53*a*).

Figure 3:
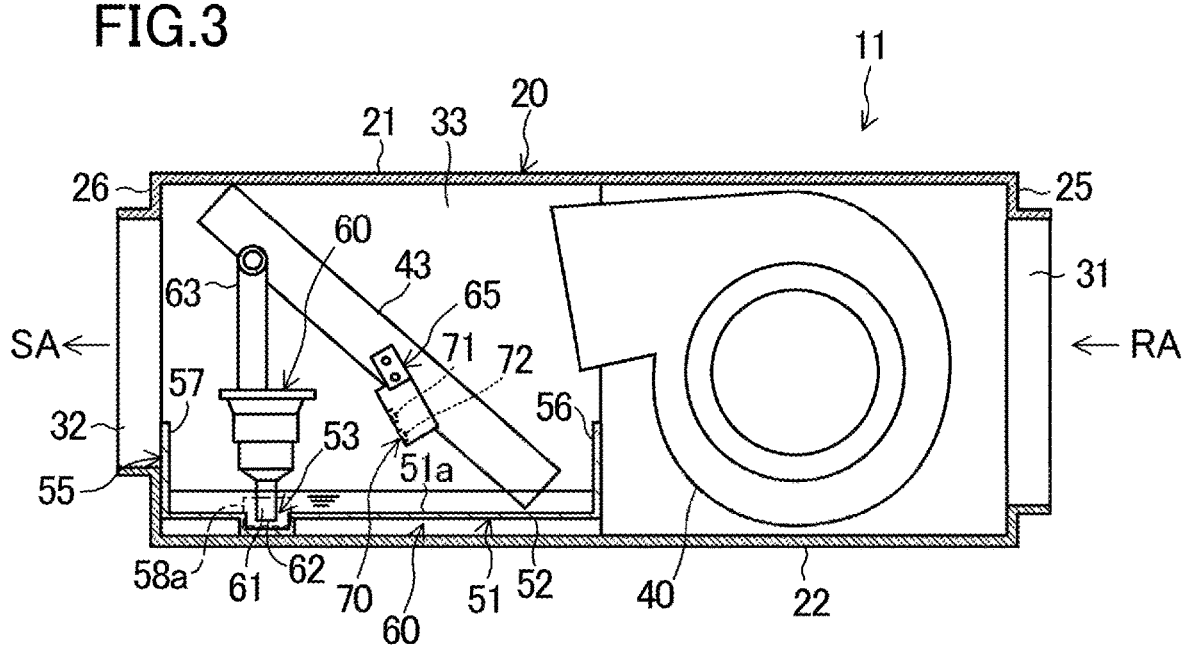
FIG. 3 is a longitudinal cross-sectional view illustrating the internal structure of the air conditioner of the first embodiment.

As shown in FIG. 3, the first side wall (56) is positioned upstream of the indoor heat exchanger (43). The second side wall (57) is located downstream of the indoor heat exchanger (43). The first side wall (56) and the second side wall (57) face each other. As shown in FIG. 1, the third side wall 58 is formed on the back side of the front plate 23 of the casing 20. The third side wall (58) extends laterally between the front end of the first side wall (56) and the front end of the second side wall (57).

Figure 6:
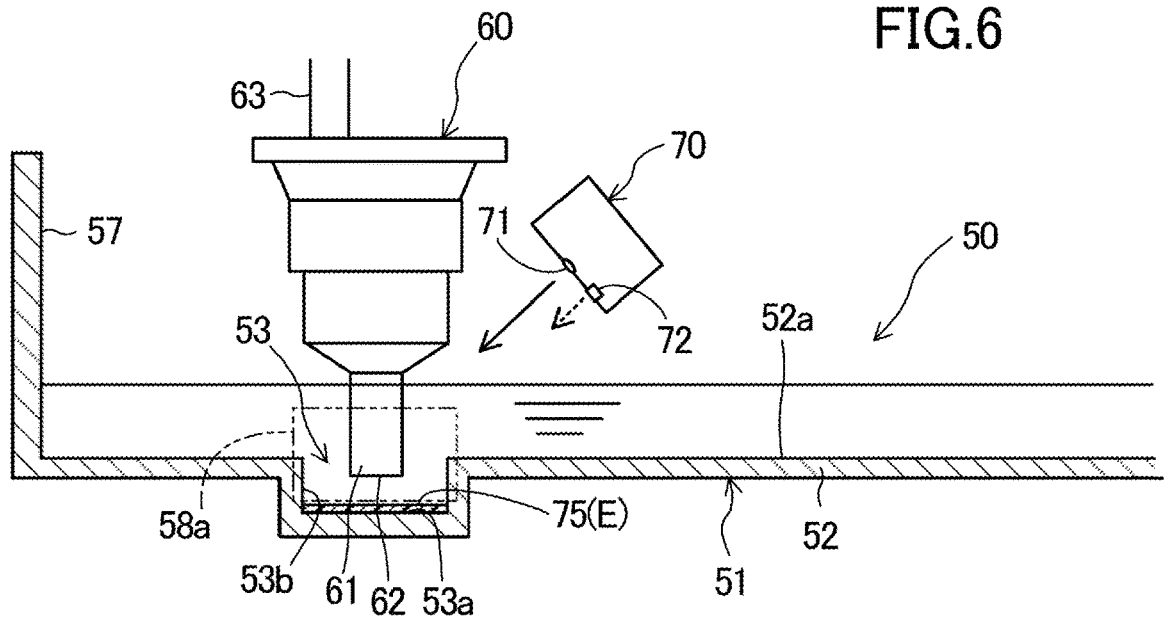
FIG. 6 is an enlarged view schematically illustrating a drain pan of the first embodiment.

The third side wall (58) is provided with the inspection window (58*a*) mentioned above, as indicated by the imaginary lines in FIGS. 3 and 6. The inspection window (58*a*) is formed in a rectangular shape as viewed from the front. The inspection window (58*a*) is made of a transparent or translucent material. The recessed portion (53) of the drain pan (50) is positioned behind the inspection window (58*a*). The drain pump (60) is positioned behind the inspection window (58*a*). Strictly, the suction portion (61) of the drain pump (60) is positioned behind the inspection window (58*a*). The inspection window (58*a*) is exposed to the outside of the casing (20) through the opening (23*a*) of the casing (20). The opening (23*a*) of the casing (20), the inspection window (58a), the recessed portion (53), and the suction portion (61) of the drain pump (60) overlap each other as viewed in the thickness direction of the front plate (23). The service provider or any other operator can see the inside of the recessed portion (53) of the drain pan (50) through the inspection window (58a). Also, the service provider or any other operator can see the suction portion (61) of the drain pump (60) through the inspection window (58a).

The drain pan (50) is an imaging target of a camera (70). The drain pan (50) is made of a resin material. A color of at least the bottom surface (51a) of the drain pan (50) is relatively light, for example, white or beige. In other words, the brightness of the color of at least the bottom surface (51a) of the drain pan (50) is relatively high.

Drain Pump

The drain pump (60) is disposed inside the drain pan (50). The drain pump (60) is disposed behind the third side wall (58). The drain pump (60) constitutes a pump for discharging water in the drain pan (50). The suction portion (61) for sucking water is provided at a lower portion of the drain pump (60). The suction portion (61) is made of a suction pipe. A water inlet (62) into which water flows is formed at the lower end of the suction portion (61). The water inlet (62) opens toward the second bottom surface (53a) of the recessed portion (53).

A drain pipe (63) is connected to an upper portion of the drain pump (60). The drain pipe (63) communicates with the discharge side of the drain pump (60). The drain pipe (63) passes through an upper portion of the front plate (23) of the casing (20) in the thickness direction of the front plate (23). When the drain pump (60) is operated, water accumulated in the drain pan (50) is sucked into the suction portion (61) of the drain pump (60). The sucked water is discharged from the drain pump (60). The discharged water is discharge to the outside of the casing (20) through the drain pipe (63). The drain pump (60), along with the drain pan (50), is the imaging target of the camera (70).

Electric Component Box

As illustrated in FIG. 1, an electric component box (16) is disposed in a portion of the front plate (23) near the fan (40). A printed board (17) is housed in the electric component box (16). A power source circuit, an electronic component, and a control circuit are mounted on the printed board (17). The printed board (17) constitutes a control unit (80) which will be described in detail later.

The electric component box (16) includes a box body (16a) having a front surface with an opening, and an electric component cover (16b) opening and closing the opening surface of the box body (16a). The electric component cover (16b) forms a part of the front plate (23). The electric component cover (16b) is detached to expose the inside of the electric component box (16) to the maintenance space (15).

Stay

Figure 5:
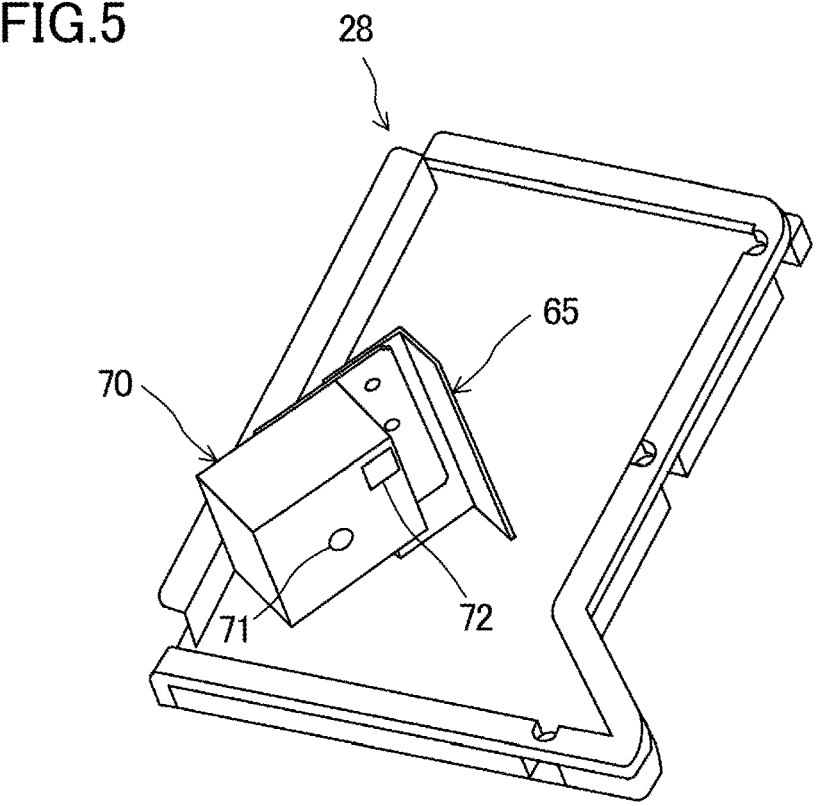
FIG. 5 is a perspective view illustrating an inside structure of an inspection cover of the first embodiment.

As shown in FIG. 5, a stay (65) is provided on the inner surface of the inspection cover (28). The stay (65) is fixed to the inspection cover (28) and constitutes a support member to which the camera (70) is attached. The base end of the stay (65) is welded to the inner surface of the inspection cover (28). The base end of the stay (65) may be fastened to the inner surface of the inspection cover (28) with a fastening member. The camera (70) is detachably attached to the distal end of the stay (65). When the inspection cover (28) is attached to the inspection port (27), the camera (70) is in an attached state in which the imaging direction of the camera (70) is directed toward the imaging target.

Camera

As shown in FIG. 5, the camera (70) constitutes an imaging device for taking an image of the imaging target. The camera (70) acquires image data of the imaging target. The camera (70) includes a lens (71) and a light source (72). The lens (71) is configured as a super-wide-angle lens. The lens (71) is a wide-angle lens or a fisheye lens.

As schematically shown in FIG. 6, the lens (71) of the camera (70) in the attached state is directed to the inside of the drain pan (50). The lens (71) of the camera (70) in the attached state is directed to the recessed portion (53) of the drain pan (50). Strictly, the camera (70) in the attached state is directed to the second bottom surface (53a) of the recessed portion (53).

The camera (70) takes an image of at least the luminous portion (75) of the drain pan (50). In addition, the camera (70) takes an image of the suction portion (61) of the drain pump (60). The image data acquired by the camera (70) includes the luminous portion (75) and the suction portion (61) of the drain pump (60).

The light source (72) constitutes a first light source that emits visible light toward the imaging target. The position and angle of the light source (72) are set so that the visible light emitted from the light source (72) is shone onto the luminous portion (75). The length of the light emission time of the light source (72) can be freely adjusted.

Luminous Portion

A light emitter (E) emitting visible light is formed on the bottom surface (51a) of the drain pan (50). The light emitter (E) of the present embodiment is configured as the luminous portion (75) containing a luminous material. The luminous portion (75) of the present example is formed only on the second bottom surface (53a) of the bottom surface (51a) of the drain pan (50). The luminous portion (75) faces the suction portion (61) or the water inlet (62) of the drain pump (60).

The luminous portion (75) is made of a coating film containing a luminous material. In other words, in the luminous portion (75), the luminous material made of luminous paint and formed on the second bottom surface (53a) has a property of storing light shone onto the luminous material and emitting the stored light. Specifically, the luminous portion (75) stores light emitted from the light source (72) of the camera (70). The luminous portion (75) emits visible light outward from the surface of the luminous portion (75) using the stored light. The color of the visible light emitted by the luminous portion (75) is relatively light. In other words, the brightness of the emission color of the luminous portion (75) is relatively high. The emission color of the luminous portion (75) is preferably light green, light blue, light yellow, or the like.

Imaging System

An imaging system (S) of the present embodiment will be described with reference to FIG. 7. The imaging system (S) according to the present embodiment includes the camera (70), the control unit (80), and a communication terminal (90). As mentioned above, the camera (70) is housed in the casing (20) of the air conditioner (10). The control unit (80) is housed in the electric component box (16). The camera (70) and the control unit (80) are connected with a cable. The communication terminal (90) is owned by a service provider, a user, or the like of the air conditioner (10). The control unit (80) may be disposed outside the electric component box (16).

The control unit (80) includes a power source (81), an air-conditioning control unit (82), an imaging control unit (83), a light source control unit (84), a storage unit (85), a processing unit (86), and a communication unit (87). Each of the air-conditioning control unit (82), the imaging control unit (83), and the processing unit (86) includes a microcomputer and a memory device (specifically, a semiconductor memory) that stores software for operating the microcomputer.

The power source (81) is configured as a power source for the camera (70). The power source (81) supplies power to the camera (70) via a cable. The power source (81) may also serve as a power source for devices other than the camera (70). The power source (81) also serves as a power source for the light source (72).

The air-conditioning control unit (82) controls each component, such as a fan (40) of the air conditioner (10) and the drain pump (60). When the air conditioner (10) starts a cooling operation, the air-conditioning control unit (82) operates the drain pump (60). When the cooling operation is stopped, the air-conditioning control unit (82) stops the drain pump (60). During the cooling operation, the drain pump (60) is basically in operation.

The imaging control unit (83) controls imaging by the camera (70). Specifically, the imaging control unit (83) controls at least the timing of the imaging by the camera (70). The imaging control unit (83) supplies power of the power source (81) to the camera (70) so that the camera (70) performs imaging at a predetermined timing. When power is supplied to the camera (70), the camera (70) captures an image of the imaging target.

The imaging control unit (83) may output an ON signal in order to make the camera (70) capture an image. In this case, when the ON signal is input to the camera (70), the camera (70) captures an image. When the camera (70) captures an image, image data of the imaging target is acquired. The image data is input to the control unit (80) via a cable.

The light source control unit (84) controls the light source (72) of the camera (70). The light source control unit (84) controls the light source (72) so that the light source (72) emits light at a predetermined timing and for a predetermined time length.

The storage unit (85) is configured as a storage medium that stores the image data acquired by the camera (70). The storage unit (85) also stores the results of the determination by the processing unit (86).

The processing unit (86) is configured to determine a degree of dirt, a location of dirt, and a type of dirt on the drain pan (50), based on a plurality of pieces of the image data stored in the storage unit (85). In this determination, deep learning of artificial intelligence (AI) may be used. The processing unit (86) may be provided on an Internet server.

The communication unit (87) is connected to the communication terminal (90) wirelessly, for example. The communication unit (87) is connected to the communication terminal (90) via a communication line using mobile high-speed communication technology (LTE). Thus, signals can be exchanged between the control unit (80) and the communication terminal (90). The communication unit (87) may be a wireless router connected to the communication terminal (90) using a wireless LAN. The communication unit (87) may be connected to the communication terminal (90) via an Internet server.

The plurality of pieces of image data stored in the storage unit (85) and the determination results of the processing unit (86) are transmitted to the communication terminal (90) via the communication unit (87).

The communication terminal (90) is configured as a smartphone, a tablet terminal, a mobile phone, a personal computer, or the like. The communication terminal (90) includes an operation unit (91) and a display (92). The operation unit (91) is configured as a keyboard, a touch panel, or the like. The service provider or any other operator operates the operation unit (91) to operate predetermined application software. Via this application software, the camera (70) can be operated to capture an image, and the acquired image data can be downloaded to the communication terminal (90).

The display (92) is configured as, for example, a liquid crystal monitor. The image data captured by the camera (70) and the determination results of the processing unit (86) are displayed on the display (92), as appropriate. The operator or the like can comprehend the state of dirt on the drain pan (50) based on the information displayed on the display (92), as appropriate.

The control unit (80) controls the camera (70) and the light source (72) so that a second operation and a first operation are repeatedly performed in sequence. In the second operation, the camera (70) captures an image when the light source (72) is in a light-emitting state. In the first operation, the camera (70) captures an image when the light source (72) is in a turn-off state. The first operation is performed after the second operation. These operations will be described in detail later.

Operation A basic operation of the air conditioner (10) according to the first embodiment is described below. The air conditioner (10) performs a cooling operation and a heating operation.

In the cooling operation, a refrigerant compressed in the compressor of the outdoor unit dissipates heat (condenses) in the outdoor heat exchanger, and is decompressed at the expansion valve. The decompressed refrigerant evaporates in the indoor heat exchanger (43) of the indoor unit (11), and is again compressed in the compressor.

When the fan (40) is operated, room air (RA) in the indoor space is sucked into the air flow path (33) through the intake port (31). The air in the air flow path (33) passes through the indoor heat exchanger (43). In the indoor heat exchanger (43), the refrigerant absorbs heat from the air, thereby cooling the air. The cooled air passes through the blow-out port (32), and is then supplied as supply air (SA) to the indoor space.

If the air is cooled to a temperature equal to or lower than the dew point in the indoor heat exchanger (43), water in the air condenses. The drain pan (50) receives this condensed water. The condensed water received by the drain pan (50) is discharged to the outside of the casing (20) by the drain pump (60).

In the heating operation, a refrigerant compressed in the compressor of the outdoor unit dissipates heat (condenses) in the indoor heat exchanger (43) of the indoor unit (11), and is decompressed at the expansion valve. The decompressed refrigerant evaporates in the outdoor heat exchanger of the outdoor unit and is again compressed in the compressor. In the indoor heat exchanger (43), the refrigerant dissipates heat to the air, thereby heating the air. The heated air is then supplied to the indoor space as supply air (SA) through the blow-out port (32).

Operation of Imaging System

In the imaging system (S), an imaging operation is performed at each predetermined timing. One imaging operation includes the second operation and the first operation which are performed successively. In one imaging operation, the first operation is executed immediately after the second operation. Hereinafter, the second operation and the first operation will be described in order.

Second Operation

When the inspection cover (28) is attached to the inspection port (27), the camera (70) is directed to the second bottom surface (53a) of the drain pan (50). When the light source (72) is in the turn-off state, the surroundings of the drain pan (50) are dark. In the second operation, the light source control unit (84) controls the light source (72) so that the light source (72) emits light. The light of the light source (72) is shone onto the second bottom surface (53a) of the drain pan (50). At the same time, in the second operation, the imaging control unit (83) controls the camera (70) so that the camera (70) performs imaging. In the second operation, the camera (70) acquires image data when the light source (72) is in the light-emitting state. In the second operation, the camera (70) acquires color image data of the drain pan (50) illuminated by the light source (72). Based on the image data, it is possible to determine the state of dirt on the second bottom surface (53a) of the drain pan (50). Specifically, the color and type of dirt adhering to the second bottom surface (53a) of the drain pan (50) can be determined.

In the second operation, the luminous portion (75) stores the light emitted by the light source (72). Specifically, when the light emitted from the light source (72) is applied shone onto the luminous portion (75), the luminous material of the luminous portion (75) stores the light. In the second operation, a light emission time $\Delta T$ of the light source (72) is set to be relatively long in order to store a sufficient amount of light in the luminous portion (75). The light emission time $\Delta T$ of the light source (72) in the second operation is set to, for example, about 10 seconds. The light emission time $\Delta T$ can be appropriately changed by the control unit (80).

In the second operation, the light emitted from the light source (72) may sometimes be reflected on the bottom surface (51a) of the drain pan (50), causing the image data captured by the camera (70) to be unclear. In particular, when water is present in the drain pan (50), the light emitted from the light source (72) is reflected on the water surface, and the image data is likely to be unclear. In addition, the dirt adhering to the bottom surface (51a) of the drain pan (50) is often relatively light in color (white, pink, light brown, or the like). These colors vary depending on the type of fungus, mold, biofilm, or the like. In the case in which the dirt adhering to the bottom surface (51a) of the drain pan (50) is relatively light in color, the color tone of the dirt is close to the color tone of the drain pan (50). In this case, it is difficult to distinguish the drain pan (50) from the dirt in the image data, and thus difficult to determine the dirt. Therefore, in the present embodiment, the following first operation is performed immediately after the second operation.

First Operation

The first operation is executed after a lapse of the light emission time $\Delta T$ of the light source (72) in the second operation.

In the first operation, the light source control unit (84) controls the light source (72) into the turn-off state. At the same time, the imaging control unit (83) controls the camera (70) so that the camera (70) performs imaging. When the light source (72) is turned off, the surroundings of the drain pan (50) become dark. The light stored in the luminous portion (75) is emitted as visible light from the surface of the second bottom surface (53a). In the first operation, the image data is acquired in a state in which the surroundings of the drain pan (50) are dark, and the luminous portion (75) emits visible light. The image data has the following characteristics.

When no dirt is adhering to the second bottom surface (53a) of the drain pan (50), the visible light emitted from the luminous portion (75) appears in the image data as it is. In other words, in the image data, the entire area of the second bottom surface (53a) shows the emission color of the luminous portion (75).

Dirty portions of the second bottom surface (53a) of the drain pan (50) cover the surface of the luminous portion (75). The surface of the luminous portion (75) is exposed at portions without dirt. The portions where no dirt adheres appear in the image data as the emission color. In the portions where dirt adheres, the emission color is less likely to appear due to the dirt. Thus, the portions with dirt appear in a darker color (e.g., black) than the portions where no dirt adheres. Therefore, in the image data acquired in the first operation, it is possible to determine the degree of dirt, the location of dirt, the thickness of dirt, and the like, based on the presence or absence of the emission color on the second bottom surface (53a) and the density of the emission color.

In the first operation, the light source (72) is in the turn-off state. Thus, contrary to the second operation, the light of the light source (72) is not reflected on the drain pan (50) or the water surface in the drain pan (50). Therefore, it is possible to avoid situations in which the image data is unclear due to the reflected light.

In addition, in the first operation, dirt can be determined even if the color of the dirt is close to that of the drain pan (50). This is because the dirty portions in the image data are darker in color than the portions not dirty since the emission color is less likely to appear at the dirty portions regardless of the color of the dirt.

In the image data acquired in the first operation, the thickness of dirt can be determined according to the density of the emission color. Specifically, if the dirt is relatively thick, the emission color hardly appears, and the dirty portion shows a color close to black. On the other hand, if the dirt is relatively thin, the emission color may faintly appear. Therefore, the thickness of mold or biofilm can be determined according to the density of the emission color in the image data.

Memory Operation

In one imaging operation, the second operation and the first operation described above are performed successively. The storage unit (85) stores image data of each imaging operation as appropriate. In other words, the image data of the second operation and the image data of the first operation performed immediately after the second operation are stored in the storage unit (85) in association with each other as one set of image data.

Determination Operation

The processing unit (86) determines a state of dirt on the second bottom surface (53*a*) of the drain pan (50) based on one set of image data. Specifically, the processing unit (86) determines a degree of dirt, a location where dirt is accumulated, a thickness of dirt or the like, based on the image data acquired in the first operation. In addition, the processing unit (86) determines the color and type of the dirt based on the image data acquired in the second operation. The processing unit (86) is capable of identifying multiple pieces of information about the dirt on the drain pan (50) based on the determination results. The determination results are stored in the storage unit (85) in association with the corresponding one set of image data. The determination operation may be performed by the processing unit (86) provided on an Internet server.

Communication Operation

The image data of each imaging operation stored in the storage unit (85) is transmitted to the communication terminal (90) as one set of image data. In addition, the determination results of the processing unit (86) corresponding to one set of image data are transmitted to the communication terminal (90). The service provider or any other operator can check one set of image data and the determination results corresponding thereto on the display (92) of the communication terminal (90). Thus, the service provider or any other operator can accurately comprehend the state of dirt on the second bottom surface (53*a*) of the drain pan (50).

Note that the processing unit (86) does not need to perform the determination operation described above. In such a case, the service provider or the user determines the state of dirt of the drain pan (50) based on the image data displayed on the display (92) of the communication terminal (90).

Advantages of First Embodiment

An air treatment device of the first embodiment includes: a casing (20); an imaging target (a drain pan (50)) disposed inside the casing (20); and an imaging device (a camera (70)) configured to capture an image of the drain pan (50), wherein the drain pan (50) includes a light emitter (E) configured to emit visible light from a surface of the drain pan (50), and the camera (70) captures an image of at least the light emitter (E) of the drain pan (50) and acquires image data including the light emitter (E).

When the color of the drain pan (50) and the color of the dirt are close to each other, it is difficult to determine, by normal imaging, the dirt adhering to the drain pan (50) and the dirt cannot be identified. On the other hand, in the present embodiment, the presence or absence of dirt that adheres, the location where the dirt adheres, the thickness of dirt, the degree of dirt, and the like can be determined based on the presence or absence of the emission color of visible light and the density of the emission color of the visible light in the image data.

When an image of the drain pan (50) is captured using the light source, the light is reflected on the drain pan (50) or a water surface in the drain pan (50), and the image data becomes unclear. To address this, in the present embodiment, the image data is not unclear due to the reflected light since the dirt is determined with visible light from the light emitter (E) of the drain pan (50).

The air treatment device of the first embodiment further includes a first light source (light source (72)) configured to emit light, wherein the light emitter (E) is a luminous portion (75) including a luminous material that stores light emitted from the light source (72). With this configuration, visible light can be emitted from the surface (light emitter (E)) of the drain pan (50) using the light stored in the luminous portion (75).

In the first embodiment, when the light source (72) is in a turn-off state, the camera (70) performs a first operation in which an image of the luminous portion (75) configured to emit the visible light is captured. In the first operation, when the light source (72) is turned off, the surroundings of the drain pan (50) become dark, and the visible light of the light emitter (E) stands out. Accordingly, in the image data acquired in the first operation, the difference in density between the portion where dirt adheres and the portion where no dirt adheres becomes significant. As a result, it is possible to improve the accuracy in determining the dirt based on the image data acquired in the first operation.

In the first embodiment, when the light source (72) is in a light-emitting state, the camera (70) performs a second operation in which an image of the drain pan (50) is captured. In the second operation, the light source (72) is set to be in the light-emitting state, and image data can be acquired while the surroundings of the drain pan (50) are bright. The type and color of dirt can be determined based on the image data acquired in the second operation.

In the first embodiment, the camera (70) performs the first operation after the second operation. In the second operation, the light source (72) emits light, and the light can thus be stored in the luminous portion (75). The light can be used as a light emitting source of the luminous portion (75) in the first operation. In the second operation, the type and color of dirt can be determined. In the first operation performed immediately after the second operation, it is possible to determine the presence or absence of dirt, the location of dirt, the thickness of dirt, the degree of dirt, and the like. Therefore, multiple pieces of information about the drain pan (50) can be obtained substantially at the same time.

Obtaining multiple sets of data consisting of the image data acquired in the first operation and the image data acquired in the second operation makes it possible to obtain, from these multiple sets of data, the correlation between the image data acquired in the first operation and the image data acquired in the second operation. Using this correlation makes it possible to estimate, just by executing one of the first operation or the second operation, information of the other image data of the first operation or the second operation.

In the first embodiment, the light source (72) is provided in the camera (70). Therefore, adjusting the position and angle of the camera (70) to the light emitter (E) of the imaging target (50) allows the light of the light source (72) to be reliably applied onto the light emitter (E).

In the first embodiment, the imaging target is a drain pan (50) that receives water. Therefore, the processing unit (86), a service provider, a user, or the like can determine the state of dirt on the drain pan (50).

In the first embodiment, the light emitter (E) is formed at least on the bottom surface (51*a*) of the drain pan (50). Dirt such as mold or biofilm is likely to adhere particularly to the bottom surface (51*a*) of the drain pan (50). The camera (70) captures an image of the bottom surface (51*a*) of the drain pan (50). Therefore, the processing unit (86), the service provider, the user, or the like can determine the state of dirt on the bottom surface (51a). Hence, the service provider, the user, or the like can quickly comprehend that the bottom surface (51a) of the drain pan (50) is dirty and clean the bottom surface (51).

The air treatment device of the first embodiment further includes a pump (60) having a suction portion (61) configured to pump water in the drain pan (50), wherein the light emitter (E) is formed at least at a portion (a second bottom surface (53a)) of the bottom surface (51a) positioned below the suction portion (61). Dirt adhering to the second bottom surface (53a) causes the suction portion (61) of the drain pump (60) to easily clog. The service provider, the user, or the like can quickly comprehend the state of dirt on the second bottom surface (53a). Therefore, the service provider, the user, or the like can quickly clean the second bottom surface (53a). As a result, the risk of clogging of the suction portion (61) of the pump (60) can be reduced.

In the first embodiment, the light emitter (E) is formed at the lowermost portion (a second bottom surface (53a)) of the bottom surface (51a) of the tray (50). Dirt tends to accumulate on the second bottom surface (53a) that is the lowermost portion of the bottom surface (51a) of the tray (50). The processing unit (86), the service provider, the user, or the like can determine the state of dirt on the second bottom surface (53a). Therefore, the service provider, the user, or the like can quickly comprehend the state of dirt on the second bottom surface (53a) and clean the second bottom surface (53a).

Variations of First Embodiment

The first embodiment described above may be modified as follows.

First Variation

Figure 8:
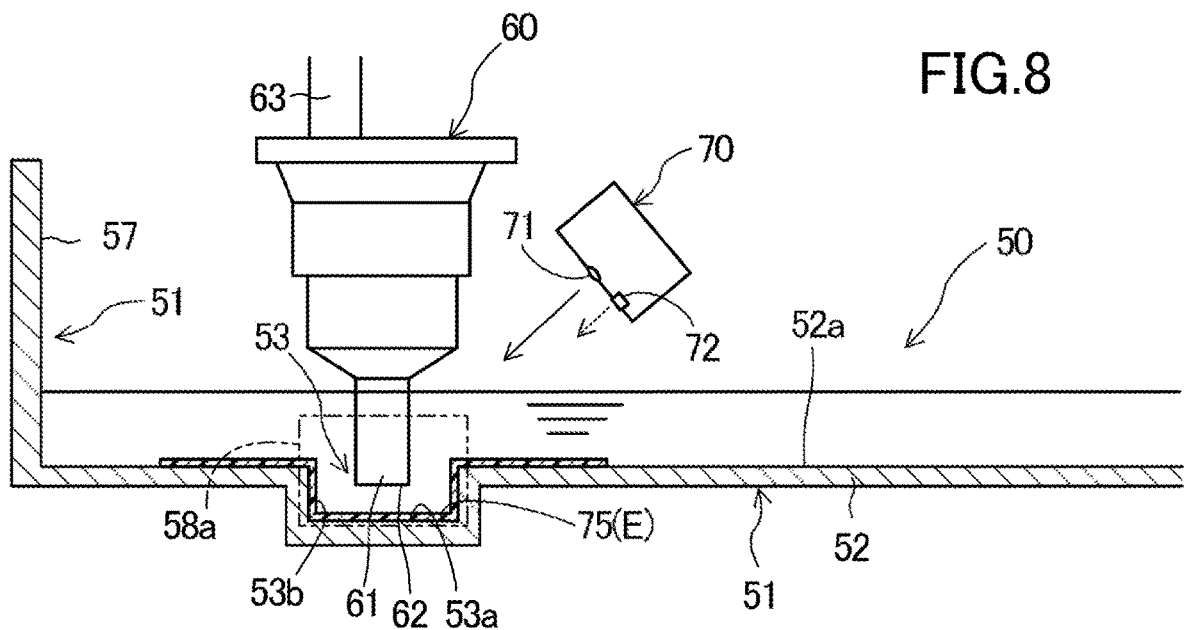
FIG. 8 is an enlarged view schematically illustrating a drain pan of a first variation.

In a first variation shown in FIG. 8, the region where the luminous portion (75) is formed is wider than in the first embodiment. The luminous portion (75) of the first variation is formed on the inner surface of the recessed portion (53) and a part of the first bottom surface (52a). More specifically, the luminous portion (75) of the first variation is formed on the second bottom surface (53a) of the recessed portion (53), the side surface (53b) of the recessed portion (53), and a part of the first bottom surface (52a) of the bottom plate portion body (52).

The imaging range of the camera (70) includes the second bottom surface (53a), the side surface (53b), and the first bottom surface (52a). Therefore, in the first variation, it is possible to check the state of dirt adhering not only to the second bottom surface (53a) of the recessed portion (53) but also to the side surface (53b) of the recessed portion (53) and the first bottom surface (52a).

The luminous portion (75) may be formed only on the second bottom surface (53a) and the side surface (53b) of the recessed portion (53). The luminous portion (75) may be formed only on the first bottom surface (52a). The luminous portion (75) may be formed on the entire inner surface of the drain pan (50).

Second Variation

Figure 9:
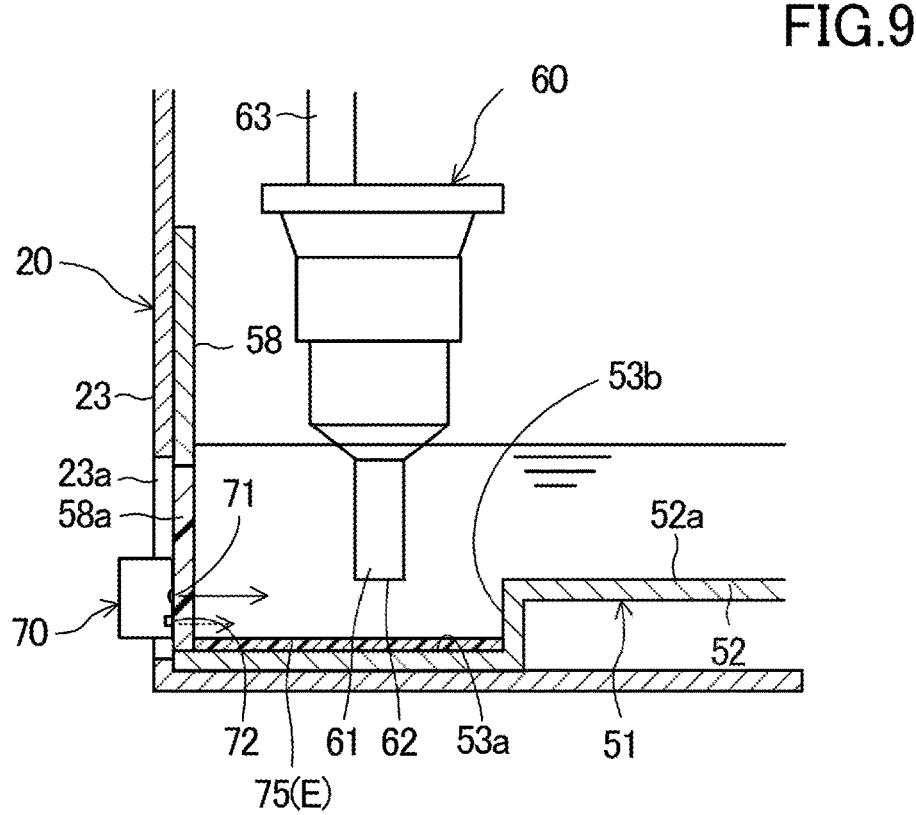
FIG. 9 is an enlarged view schematically illustrating a drain pan of a second variation.

In a second variation schematically shown in FIG. 9, the position of the camera (70) is different from that in the first embodiment. The camera (70) of the second variation is disposed on the outer side of the inspection window (58a). The camera (70) is positioned inside the opening (23a) of the front plate (23) of the casing (20). The camera (70) is fixed to, for example, a lower portion of the inspection window (58a). The lens (71) of the camera (70) is directed to the imaging target (second bottom surface (53a)) through the inspection window (58a).

In the second variation, the camera (70) captures an image of the second bottom surface (53a) (luminous portion (75)) through the inspection window (58a). The light source (72) shines light onto the luminous portion (75) through the inspection window (58a). Thus, the second operation and the first operation can be performed as in the first embodiment.

In the second variation, the camera (70) is disposed outside the casing (20). Thus, the camera (70) does not need to be attached inside the casing (20). This configuration facilitates the attachment and maintenance work of the camera (70).

In the second variation, the camera (70) is provided with an operation unit that makes the light source (72) emit light. The operation unit can be manually operated by an operator or the like to make the light source (72) emit light. The operator or the like makes the light source (72) emit light by manual operation in checking the inside of the drain pan (50) through the inspection window (58a). As a result, the inside of the drain pan (50) is illuminated by the light source (72), and the visibility of the inside of the drain pan (50) is improved.

In the second variation, the light source (72) may be separated from the camera (70) and disposed on the inner side of the inspection window (58a). Thus, the light of the light source (72) can be applied reliably onto the luminous portion (75) of the drain pan (50).

Third Variation

Figure 10:
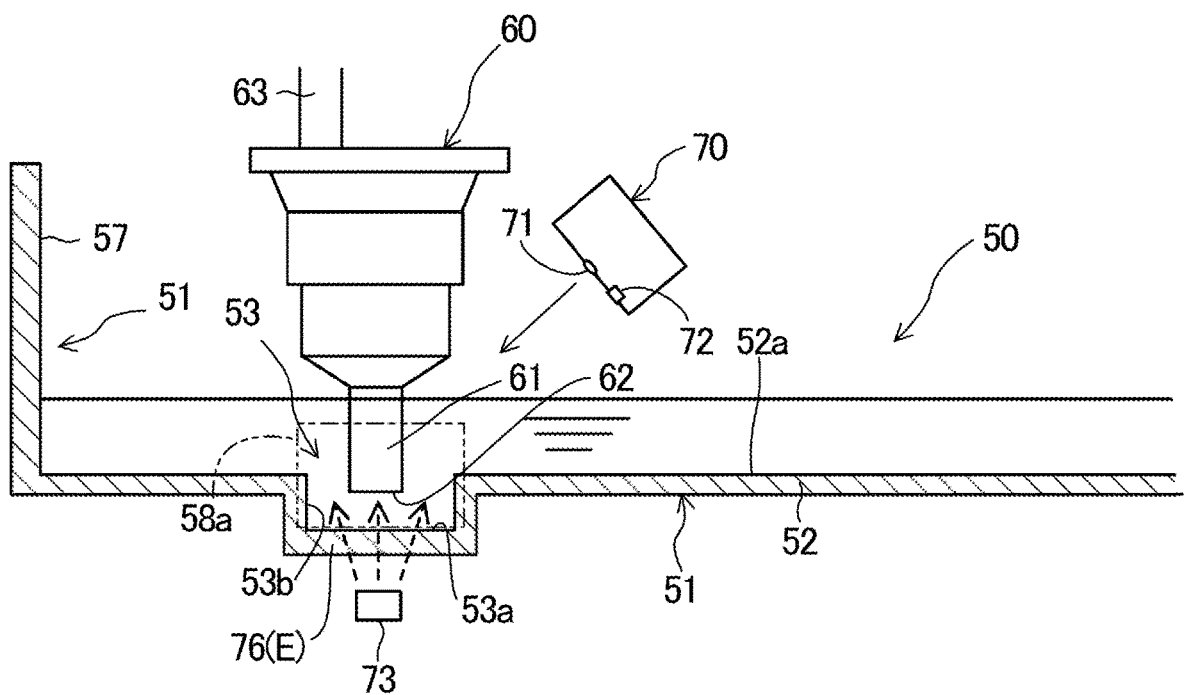
FIG. 10 is an enlarged view schematically illustrating a drain pan of a third variation.

In a third variation schematically shown in FIG. 10, a configuration of the light emitter (E) and other configurations are different from those of the first embodiment and the first and second variations. The air conditioner (10) of the third variation has a light emitting diode (LED) (73) as a second light source. The LED (73) is configured separately from the camera. The LED (73) is disposed on the back side of the bottom plate portion (51) of the drain pan (50). Specifically, the LED (73) is disposed on the back side of a bottom wall (translucent portion (76)) of the recessed portion (53). In other words, the LED (73) is disposed on the back side of the second bottom surface (53a) of the recessed portion (53). The color of visible light of the LED (73) is relatively light. In other words, the brightness of the emission color of the LED (73) is relatively high. Specifically, the emission color of the LED (73) is light green, light blue, light yellow, or the like. The second light source (73) may be another light source such as an organic EL.

The translucent portion (76) constitutes the bottom wall of the recessed portion (53). A second bottom surface (53a) is formed on the surface of the translucent portion (76). The translucent portion (76) is made of a translucent material that transmits visible light shone by the LED (73). The translucent portion (76) is made of a relatively thin resin material. The LED (73) emits visible light toward the translucent portion (76). The visible light passes through the translucent portion (76). At this time, the surface (second bottom surface (53a)) of the translucent portion (76) emits light that is relatively light in color.

In an imaging operation of the third variation, the second operation and the first operation described above are sequentially performed.

In the second operation, the camera (70) captures an image of the second bottom surface (53a) when the light source (72) of the camera (70) is in the light-emitting state. The color image data of the second bottom surface (53a) is thus acquired. As in the first embodiment, the processing unit (86) or the service provider can determine the color and type of dirt on the drain pan (50) based on the image data.

The first operation is performed immediately after the second operation. In the first operation, the light source (72) of the camera (70) is in the turn-off state. At the same time, the LED (73) is in the light-emitting state. As a result, the surface of the translucent portion (76) or the second bottom surface (53a) emits light. In the first operation, the camera (70) captures an image of the second bottom surface (53a) when the LED (73) is in the light-emitting state. In the image data acquired in this state, a portion where no dirt adheres shows the emission color, and a portion where dirt adheres is dark in color (e.g., black). As in the first embodiment, the processing unit (86) or the service provider can determine the degree of dirt, the location of dirt, the thickness of dirt, and the like on the drain pan (50), based on the image data.

The LED (73) may be disposed on the back side of a portion of the translucent portion (76) closer to the second bottom surface (53a). Specifically, the LED (73) may be embedded in the bottom wall of the recessed portion (53).

The air treatment device of the third variation includes a second light source (an LED (73)) disposed on a back side of the light emitter (E) and configured to emit visible light, wherein the light emitter (E) is a translucent portion (76) through which the visible light emitted from the LED (73) passes. In this configuration, it is possible to cause the imaging target (50) to emit light by simply transmitting the visible light of the LED (73) through the translucent portion (76). In the first operation, the state of dirt can be determined based on the visible light transmitted through the translucent portion (76).

Second Embodiment

An air conditioner (10) of the second embodiment has a basic configuration different from that of the first embodiment. The air conditioner (10) of the second embodiment takes outdoor air (OA) in and adjusts the temperature and humidity of the air taken in. The air conditioner (10) supplies treated air as supply air (SA) into the indoor space. The air conditioner (10) is an outside air treatment system. The air conditioner (10) includes a humidifier (45) for humidifying air, for example, in the winter season.

The air conditioner (10) is installed in a space in the ceiling cavity. The air conditioner (10) includes an outdoor unit (not shown) and an indoor unit (11), as in the first embodiment. A refrigerant circuit is formed by connecting the outdoor unit and the indoor unit (11) via a refrigerant pipe.

Indoor Unit

Figure 11:
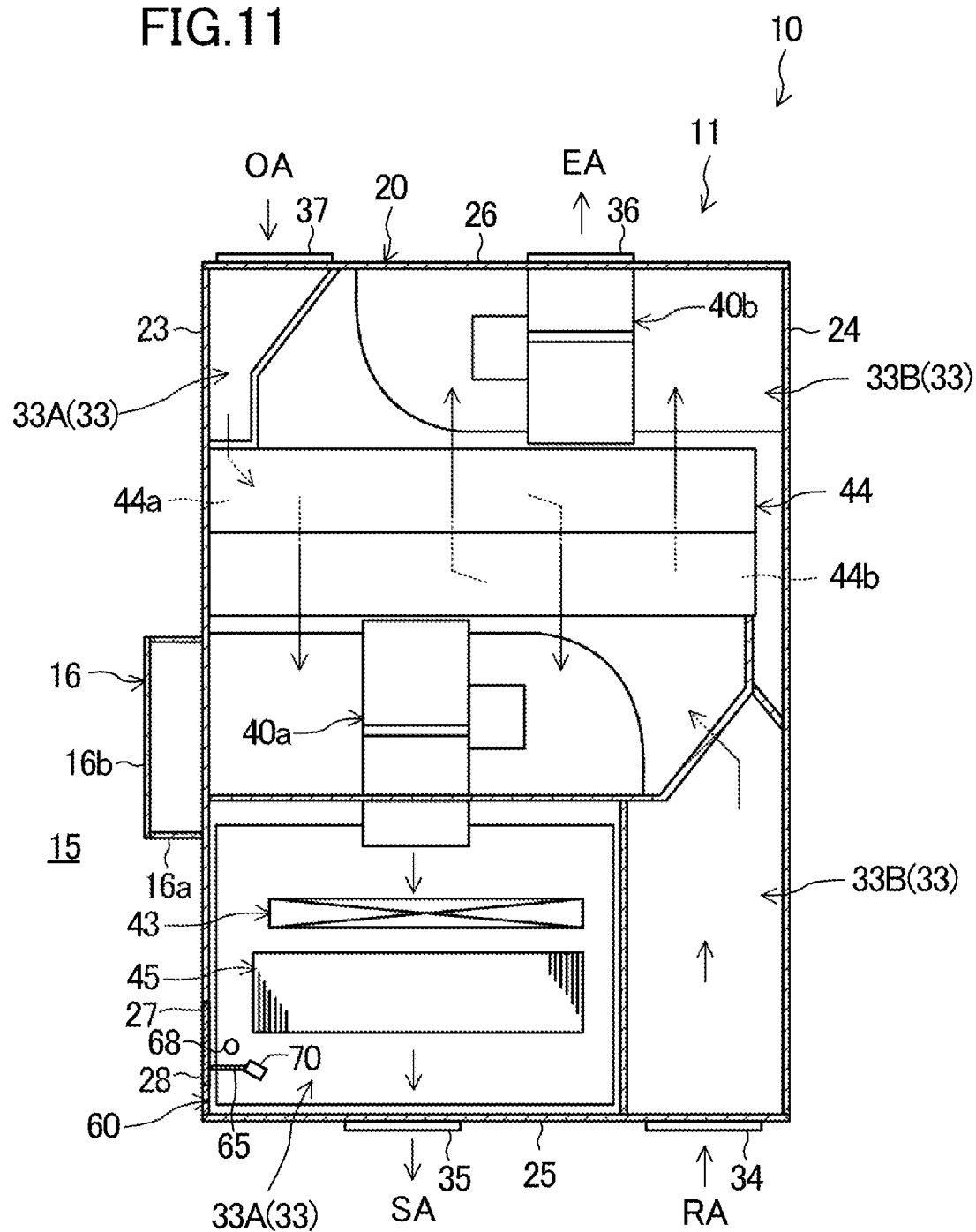
FIG. 11 is a plan view illustrating an internal structure of an air conditioner of a second embodiment.
Figure 12:
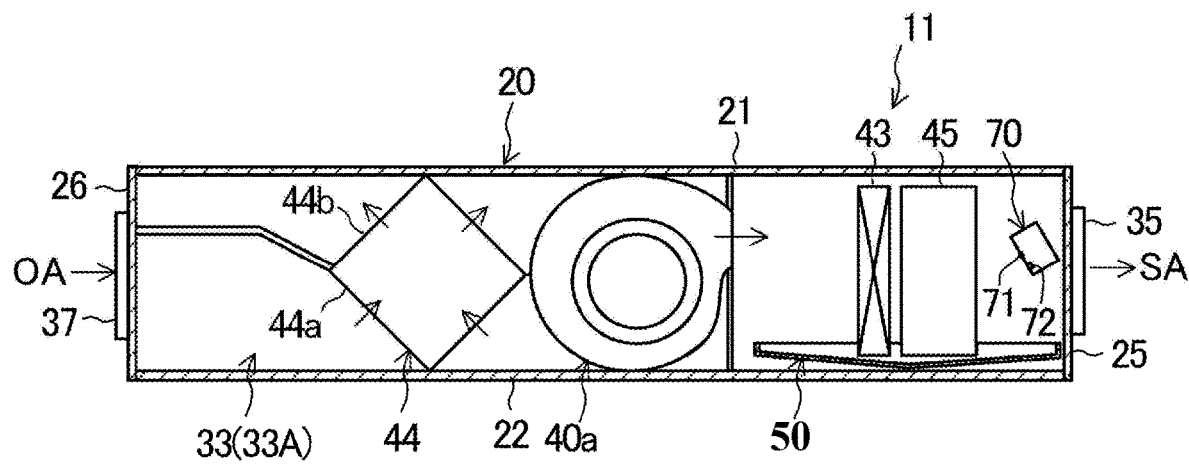
FIG. 12 is a longitudinal cross-sectional view illustrating the internal structure of the air conditioner of the second embodiment.

As illustrated in FIGS. 11 and 12, the indoor unit (11) includes a casing (20) installed in the ceiling cavity, an air supply fan (40a), an exhaust fan (40b), an indoor heat exchanger (43), a total heat exchanger (44), a humidifier (45), and a drain pan (50).

Casing

The casing (20) has a shape of a rectangular parallelepiped hollow box. As in the first embodiment, the casing (20) of the second embodiment includes a top plate (21), a bottom plate (22), a front plate (23), a rear plate (24), a first side plate (25), and a second side plate (26).

The front plate (23) faces a maintenance space (15). An electric component box (16) is provided on the front side of the front plate (23). An inspection port (27) is formed in the front plate (23). An inspection cover (28) is attached to the inspection port (27). The first side plate (25) has an inside air port (34) and an air supply port (35). The inside air port (34) is connected to an inside air duct (not shown). The inflow end of the inside air duct communicates with the indoor space. The air supply port (35) is connected to an air supply duct (not shown). An outflow end of the air supply duct communicates with the indoor space. The second side plate (26) has an exhaust port (36) and an outside air port (37). The exhaust port (36) is connected to an exhaust duct (not shown). An outflow end of the exhaust duct communicates with the outdoor space. The outside air port (37) is connected to an outside air duct (not shown). The inflow end of the outside air duct communicates with the outdoor space.

An air supply path (33A) and an exhaust path (33B) are formed in the casing (20). The air supply path (33A) is a flow path extending from the outside air port (37) to the air supply port (35). The exhaust path (33B) is a flow path extending from the inside air port (34) to the exhaust port (36).

Total Heat Exchanger

The total heat exchanger (44) has a horizontally oriented quadrangular prism shape. The total heat exchanger (44) includes, for example, two types of sheets alternately stacked in the horizontal direction. The sheets of one of the two types form a first passage (44a) communicating with the air supply path (33A). The sheets of the other type form a second passage (44b) communicating with the exhaust path (33B). Each sheet is made of a material having heat transfer and hygroscopic properties. The total heat exchanger (44) transfers sensible heat between the air flowing through the first passage (44a) and the air flowing through the second passage (44b). The total heat exchanger (44) transfers latent heat between the air flowing through the first passage (44a) and the air flowing through the second passage (44b).

Air Supply Fan

An air supply fan (40a) is disposed in the air supply path (33A). Strictly, the air supply fan (40a) is disposed in a portion of the air supply path (33A) between the first passage (44a) of the total heat exchanger (44) and the indoor heat exchanger (43). The air supply fan (40a) transfers air in the air supply path (33A).

Exhaust Fan

An exhaust fan (40b) is disposed in the exhaust path (33B). Strictly, the exhaust fan (40b) is disposed in a portion of the exhaust path (33B) downstream of the second passage (44b) of the total heat exchanger (44). The exhaust fan (40b) transfers the air in the exhaust path (33B).

Indoor Heat Exchanger

The indoor heat exchanger (43) is disposed in a portion of the air supply path (33A) near the front plate (23). The indoor heat exchanger (43) is configured as, for example, a fin-and-tube heat exchanger.

Humidifier

The humidifier (45) is disposed in a portion of the air supply path (33A) near the front plate (23). The humidifier (45) is disposed in a portion of the air supply path (33A) downstream of the indoor heat exchanger (43). The humidifier (45) includes a plurality of vertically extending hygroscopic members (45a) (so-called humidifying elements) arranged in the horizontal direction. Water from a water supply tank (not shown) is supplied to the hygroscopic members (45a). In the humidifier (45), evaporated air is applied to air flowing around the hygroscopic members (45a). The air flowing through the air supply path (33A) is humidified in this manner.

Drain Pan

As schematically shown in FIG. 12, the drain pan (50) is disposed below the humidifier (45). The drain pan (50) receives water (humidifying water) that has flowed out of the humidifier (45). A drain port (68) is formed in a lower portion of the drain pan (50) (see FIG. 11).

Electric Component Box

As shown in FIG. 11, the electric component box (16) is provided on a substantially central portion of the front surface of the front plate (23). The electric component box (16) houses therein electric components similar to those in the first embodiment.

Inspection Port and Inspection Cover

As shown in FIG. 11, the inspection port (27) is formed in a portion of the front plate (23) near the indoor heat exchanger (43) and the humidifier (45). The inspection port (27) is formed at a position corresponding to the drain pan (50) and the humidifier (45). Detaching the inspection cover (28) from the inspection port (27) allows inspection of the inside of the drain pan (50) and/or the humidifier (45) from the maintenance space (15). The inspection cover (28) is detachably attached to a body of the casing (20) with a plurality of fastening members.

Stay and Camera

As shown in FIG. 11, a stay (65) for supporting a camera (70) on the inspection cover (28) is provided inside the casing (20). The base end of the stay (65) is fixed to the inner surface of the inspection cover (28). A camera (70) is fixed to the distal end of the stay (65). When the inspection cover (28) is attached to the inspection port (27), the camera (70) is in an attached state in which the camera (70) is directed to the imaging target. In the second embodiment, the imaging target is the hygroscopic members (45a) of the humidifier (45). Note that in the second embodiment, the imaging target may be the drain pan (50).

Figure 13:
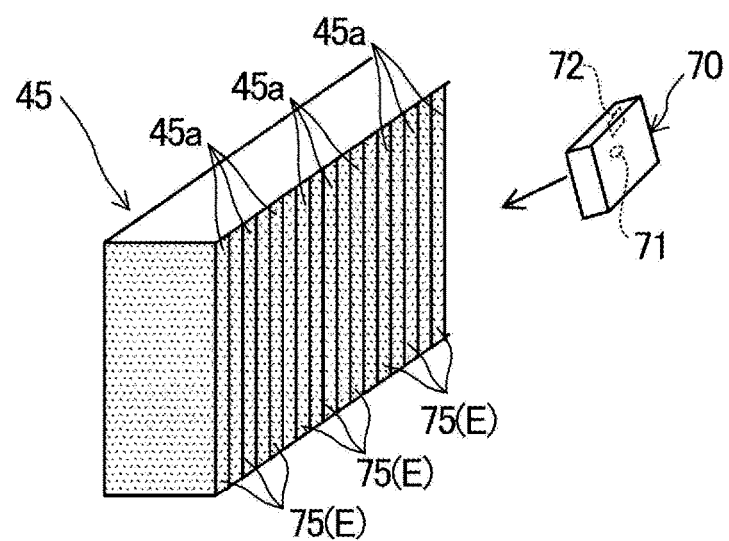
FIG. 13 is an enlarged perspective view schematically illustrating a humidifier of the second embodiment.

As in the first embodiment, the camera (70) includes a lens (71) and a light source (72). As shown in FIGS. 12 and 13, the lens (71) of the camera (70) in the attached state is directed to the hygroscopic members (45a) of the humidifier (45).

Hygroscopic Members

As in the first embodiment, a luminous portion (75) is formed on the surface of each of the hygroscopic members (45a). The luminous portion (75) is made of a coating film containing a luminous material. In other words, the luminous portion (75) is made of luminous paint applied onto the surface of the second bottom surface (53a). In each hygroscopic member (45a), the luminous portion (75) is formed at least in a portion included in the imaging range of the camera (70).

Figure 7:
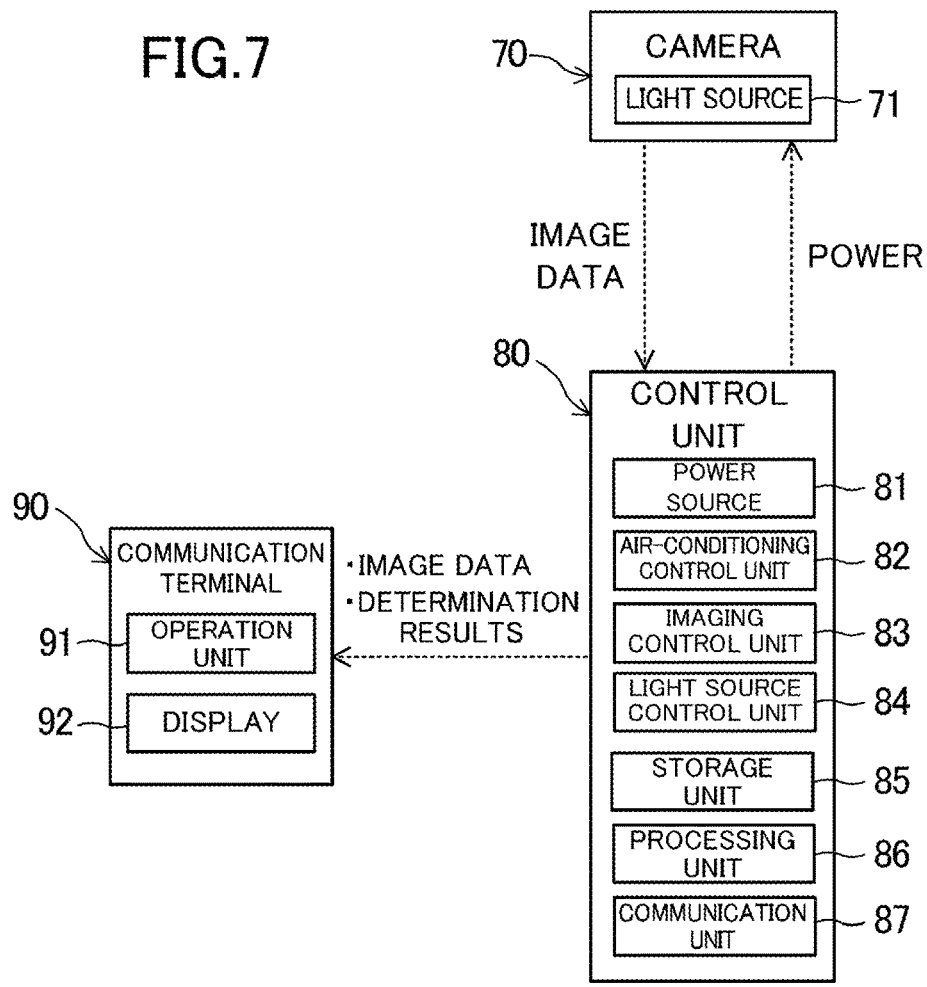
FIG. 7 is a block diagram schematically illustrating a configuration of an imaging system of the first embodiment.

Imaging System In the second embodiment, an imaging system (S) is similar to that of the first embodiment (see FIG. 7).

Operation

A basic operation of the air conditioner (10) of the second embodiment will be described with reference to FIGS. 11 and 12. The air conditioner (10) is configured to be capable of performing a cooling operation and a heating operation.

As the first embodiment described above, the indoor heat exchanger (43) serves as an evaporator in the cooling operation, and the indoor heat exchanger (43) serves as a condenser (a radiator) in the heating operation. In the heating operation, the humidifier (45) operates to humidify air. In the cooling operation and the heating operation, the air supply fan (40a) and the exhaust fan (40b) are activated. Accordingly, outdoor air (OA) is taken into the air supply path (33A) from the outside air port (37). At the same time, room air (RA) is taken into the exhaust path (33B) from the inside air port (34). Thus, an indoor space is ventilated.

In the cooling operation, the outdoor air (OA) taken into the air supply path (33A) flows through the first passage (44a) of the total heat exchanger (44). Meanwhile, the room air (RA) taken into the exhaust path (33B) flows through the second passage (44b) of the total heat exchanger (44). For example, in the summer season, the outdoor air (OA) has a higher temperature and higher humidity than the room air (RA). For this reason, latent heat and sensible heat of the outdoor air (OA) are given to the room air (RA) in the total heat exchanger (44). As a result, the air is cooled and dehumidified in the first passage (44a). In the second passage (44b), the air to which latent heat and sensible heat are given passes through the exhaust port (36) and is discharged as exhaust air (EA) to the outdoor space.

The air cooled and dehumidified in the first passage (44a) is cooled in the indoor heat exchanger (43), and then passes through the humidifier (45) that is at rest. Thereafter, the air passes through the air supply port (35) and is supplied as supply air (SA) to the indoor space.

In the heating operation, the outdoor air (OA) taken into the air supply path (33A) flows through the first passage (44a) of the total heat exchanger (44). Meanwhile, the room air (RA) taken into the exhaust path (33B) flows through the second passage (44b) of the total heat exchanger (44). For example, in the winter season, the outdoor air (OA) has a lower temperature and lower humidity than the room air (RA). For this reason, latent heat and sensible heat of the room air (RA) are given to outdoor air (OA) in the total heat exchanger (44). As a result, the air is heated and humidified in the first passage (44a). In the second passage (44b), the air from which latent heat and sensible heat are taken passes through the exhaust port (36), and is discharged as exhaust air (EA) to the outdoor space.

The air heated and humidified in the first passage (44a) is heated in the indoor heat exchanger (43), and then passes through the humidifier (45). In the humidifier (45), water in the hygroscopic members (45a) is given to the air. The air that has passed through the humidifier (45) passes through the air supply port (35), and is supplied as supply air (SA) to the indoor space.

Operation of Imaging System

In the imaging system (S) of the second embodiment, the imaging operation is performed as in the first embodiment. In one imaging operation, the second operation and the first operation described above are sequentially performed.

In the second operation, the light source (72) of the camera (70) emits light, which is shone on the hygroscopic members (45a). In the second operation, the camera (70) captures an image of the hygroscopic members (45a) when the light source (72) is in the light-emitting state. The color image data of the hygroscopic members (45a) is thus acquired. As in the first embodiment, the processing unit (86) or the service provider can determine the color and type of dirt on the hygroscopic members (45a) based on the image data. In the second operation, the light of the light source (72) shone onto the luminous portion (75) of each hygroscopic member (45a) is stored in the luminous portion (75).

The first operation is performed immediately after the second operation. In the first operation, the light source (72) of the camera (70) is in the turn-off state. As a result, the surroundings of the hygroscopic member (45a) become dark. At the same time, visible light is emitted from the surface (luminous portion (75)) of the hygroscopic member (45a). In this state, the camera (70) captures an image of the hygroscopic member (45a). In the image data, a portion where no dirt adheres shows the emission color, and a portion where dirt adheres is dark in color (e.g., black). As in the first embodiment, the processing unit (86) or the service provider can determine the degree of dirt, the location of dirt, the thickness of dirt, and the like on the hygroscopic member (45a), based on the image data.

Third Embodiment

An air conditioner (10) according to the third embodiment is a ceiling hanging-type or ceiling embedded-type air conditioner. The air conditioner (10) includes an outdoor unit (not shown) and an indoor unit (11), and a refrigerant circuit is formed by connecting the outdoor unit and the indoor unit (11) via a refrigerant pipe.

Figure 14:
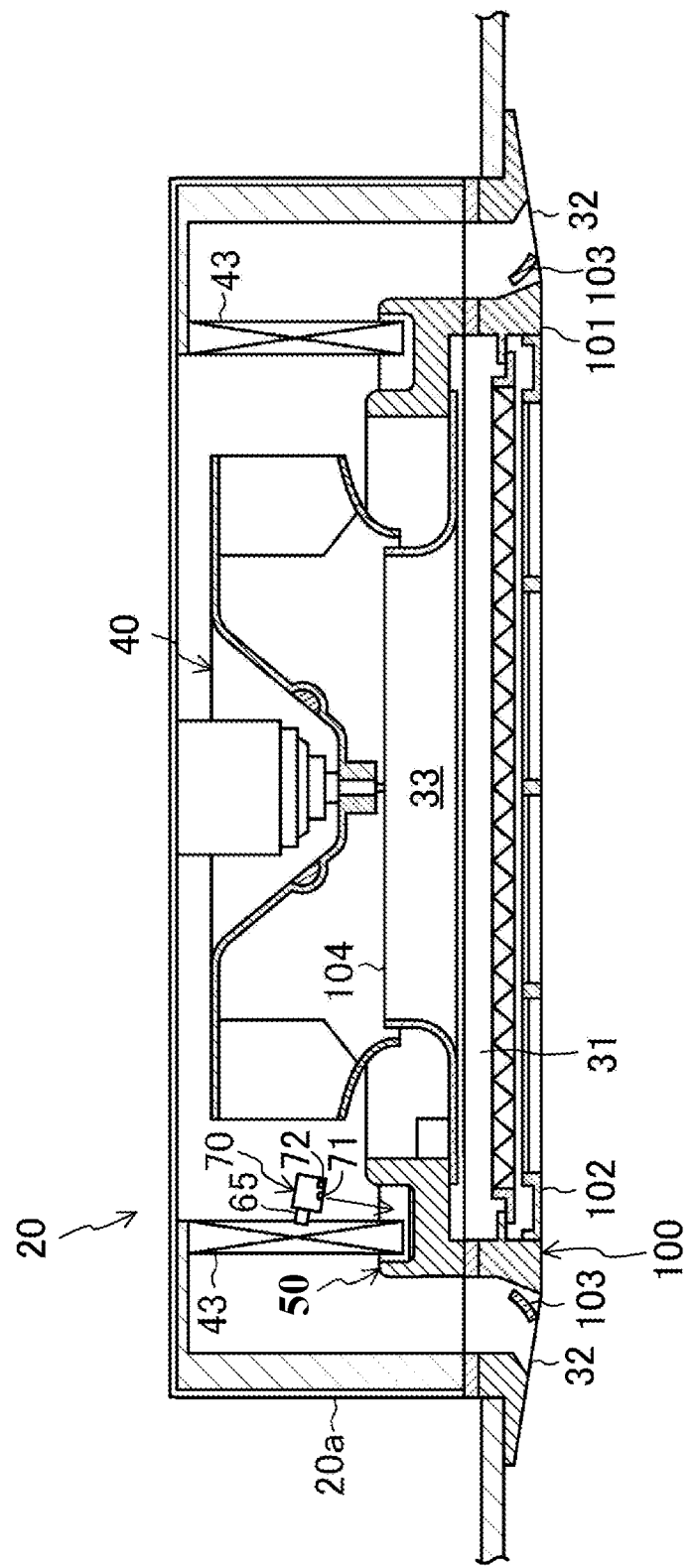
FIG. 14 is a longitudinal cross-sectional view illustrating an internal structure of an air conditioner of a third embodiment.

As illustrated in FIG. 14, the indoor unit (11) includes a casing (20) installed in a ceiling cavity. The casing (20) is comprised of a casing body (20a) and a panel (100). The casing body (20a) has a rectangular parallelepiped box-like shape with its lower side open. The panel (100) is provided detachably on the opening side of the casing body (20a). The panel (100) includes a panel body (101) in a shape of a rectangular frame and a suction grille (102) provided at the center of the panel body (101).

A single intake port (31) is formed in the center of the panel body (101). The suction grille (102) is attached to the intake port (31). A blow-out port (32) is formed in each of four side edge portions of the panel body (101). The blow-out ports (32) extend along the respective four side edges. A wind direction adjusting slat (103) is provided in each of the blow-out ports (32).

A bell mouth (104), a fan (40), an indoor heat exchanger (43), and a drain pan (50) are provided in the casing body (20a). The bell mouth (104) and the fan (40) are disposed above the suction grille (102). The indoor heat exchanger (43) is disposed so as to surround the fan (40). The indoor heat exchanger (43) is configured as a fin-and-tube heat exchanger. The drain pan (50) is disposed below the indoor heat exchanger (43).

The lens (71) of the camera (70) of the third embodiment is directed to the bottom surface (51a) of the drain pan (50). The camera (70) captures an image of at least the bottom surface (51a) of the drain pan (50).

In the third embodiment, the luminous portion (75) is formed on the bottom surface (51a) of the drain pan (50). In the imaging system (S) of the third embodiment, the imaging operation is performed in the same manner as in the first and second embodiments. In the second operation, the camera (70) captures an image of the bottom surface (51a) of the drain pan (50) when the light source (72) is in the light-emitting state. At the same time, the light is stored in the luminous portion (75) of the bottom surface (51a). In the first operation, the camera (70) captures an image of the bottom surface (51a) of the drain pan (50) when the light source (72) is in the turn-off state. Advantages of the third embodiment are the same as those of the first and second embodiments.

Another Embodiment

The embodiments and the variations described above may be configured as follows within an applicable range.

The imaging target may be a component other than the drain pan (50) and the hygroscopic members (45a). The imaging target may be the fan (40), an air filter, an inner wall of a duct, or an inner wall of a water flow path. The water flow path includes the suction portion (61) of the drain pump (60), the drain pipe of the drain pump (60), and the drain port (68). By forming the light emitter (E) (luminous portion) on these imaging targets, it is possible to reliably comprehend the state of dirt.

The tray as an imaging target may be a component other than the drain pan (50) as long as it receives water. The tray may be a water receiver installed below a water supply tank for humidification. Water in the water supply tank is supplied to the water receiver. Water in the water receiver is used for humidifying the air. The water supply tank and the water receiver are mounted on, for example, an air cleaner or a humidity control apparatus.

The imaging target may be partially or entirely configured as the luminous portion (75). Specifically, the drain pan (50) itself may be made of a member containing a luminous material (luminous portion (75)). Alternatively, only the bottom plate portion (51) of the drain pan (50) may be made of a member containing a luminous material (luminous portion (75)).

The luminous portion (75) may be subjected to water-repellent finishing or hydrophilic processing. Specifically, a fluoric coating film may be formed on the luminous portion (75), for example. The fluoric coating film can reduce the adhesion of dirt to the imaging target.

When the second bottom surface (53a) serving as the light emitter (E) is the lowermost portion of the bottom surface (51a) of the drain pan (50), the second bottom surface (53a) does not necessarily have to be positioned below the suction portion (61) of the pump (60).

The imaging device is not limited to a camera and may be, for example, an optical sensor.

The light source (72) of the camera (70) may be separated from the camera (70). The light source (72) is disposed at a position that allows light to be applied onto the luminous portion (75).

The imaging device may be disposed inside the casing of the outdoor unit.

The imaging system (S) may cause the light source (72) to emit light, and store the light in the luminous portion (75), at times other than the second operation. The first operation is performed after this operation, thereby making it possible to check the state of dirt by using the emission color of the luminous portion (75).

The air treatment device may be another device as long as the device has a casing and air flows through the device. The air treatment device may be a humidity control apparatus, a ventilator, or an air cleaner. The humidity control apparatus controls the humidity of the air in the target space. The ventilator ventilates the target space. The air cleaner purifies air in the target space.

While the embodiment and the variations thereof have been described above, it will be understood that various changes in form and details may be made without departing from the spirit and scope of the claims. The embodiment, the variations, and the other embodiments may be combined and replaced with each other as long as the functions of the target of the present disclosure are not impaired.

The expressions of "first," "second," and "third" described above are used to distinguish the terms to which these expressions are given, and do not limit the number and order of the terms.

INDUSTRIAL APPLICABILITY

The present disclosure is useful for air treatment devices.

EXPLANATION OF REFERENCES

10 Air Conditioner (Air Treatment Device)
20 Casing
50 Tray (Imaging Target)
51*a* Bottom Surface
53*a* Portion (Second Bottom Surface)
60 Pump
61 Suction Portion
70 Camera (Imaging Device)
72 Light Source (First Light Source)
73 LED (Second Light Source)
75 Luminous Portion
76 Translucent Portion
E Light Emitter

The invention claimed is:

1. An air treatment device comprising:
a casing;
an imaging target disposed inside the casing;
a first light source configured to emit light;
an imaging device configured to capture an image of the imaging target; and
a controller that controls the imaging device and the first light source, wherein
the imaging target includes a light emitter configured to emit visible light from a surface of the imaging target,
the light emitter is a luminous portion including a luminous material that stores light emitted from the first light source when the first light source is in a light-emitting state, and emits the visible light when the first light source is in a turn-off state,
the controller is configured to turn off the first light source and control the imaging device to capture a first image of at least the light emitter of the imaging target while the first light source is turned off, and to turn on the first light source and control the imaging device to capture a second image of the at least the light emitter while the first light source is turned on, and
contamination of the imaging target is determined based on the first image and the second image.

2. The air treatment device of claim 1, wherein the second image is captured after the first image.

3. The air treatment device of claim 1, wherein the first light source is provided in the imaging device.

4. The air treatment device of claim 1, further comprising:
a second light source disposed on a back side of the imaging target and configured to emit visible light towards the imaging device, wherein
the imaging target is a translucent portion configured to pass the light from the second light source.

5. The air treatment device of claim 1, wherein the imaging target is a tray that receives water.

6. The air treatment device of claim 5, wherein the luminous portion is formed at least on a bottom surface of the tray.

7. The air treatment device of claim 6, further comprising:
a pump having a suction portion configured to pump water on the tray, wherein
the luminous portion is formed at least on a portion of the bottom surface positioned below the suction portion.

8. The air treatment device of claim 6, wherein the tray has a recessed portion, and the luminous portion is formed on a bottom surface of the recessed portion.

9. The air treatment device of claim 2, wherein the imaging target is a tray that receives water.

10. The air treatment device of claim 3, wherein the imaging target is a tray that receives water.

11. The air treatment device of claim 4, wherein the imaging target is a tray that receives water.

12. The air treatment device of claim 7, wherein the tray has a recessed portion, and the luminous portion is formed on a bottom surface of the tray.

* * * * *